W. MUNSON.
TOOTHED-ROLLERS FOR COAL-BREAKERS OR CRACKERS.
No. 169,654. Patented Nov. 9, 1875.
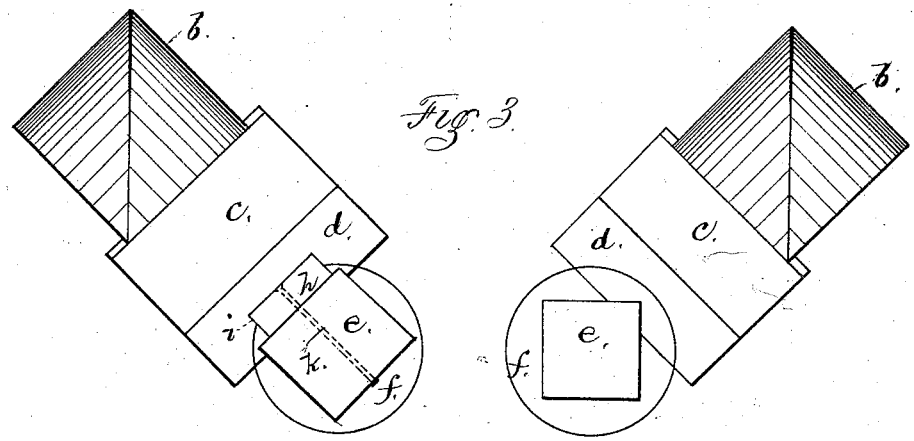
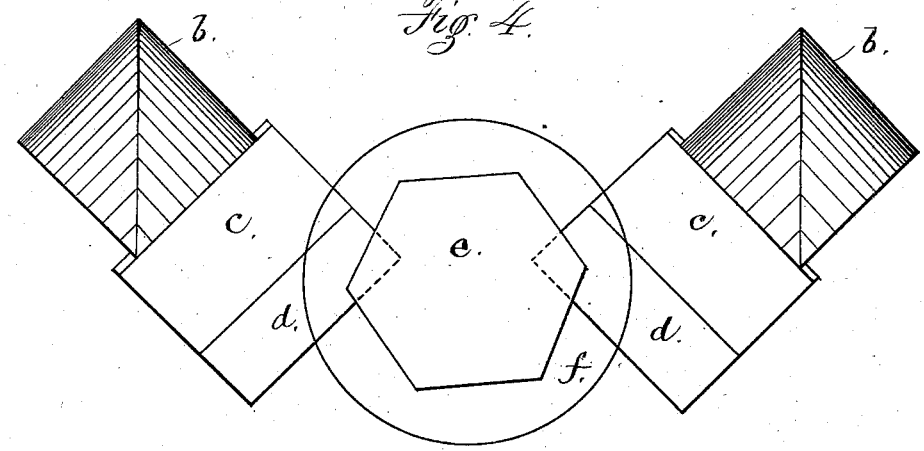

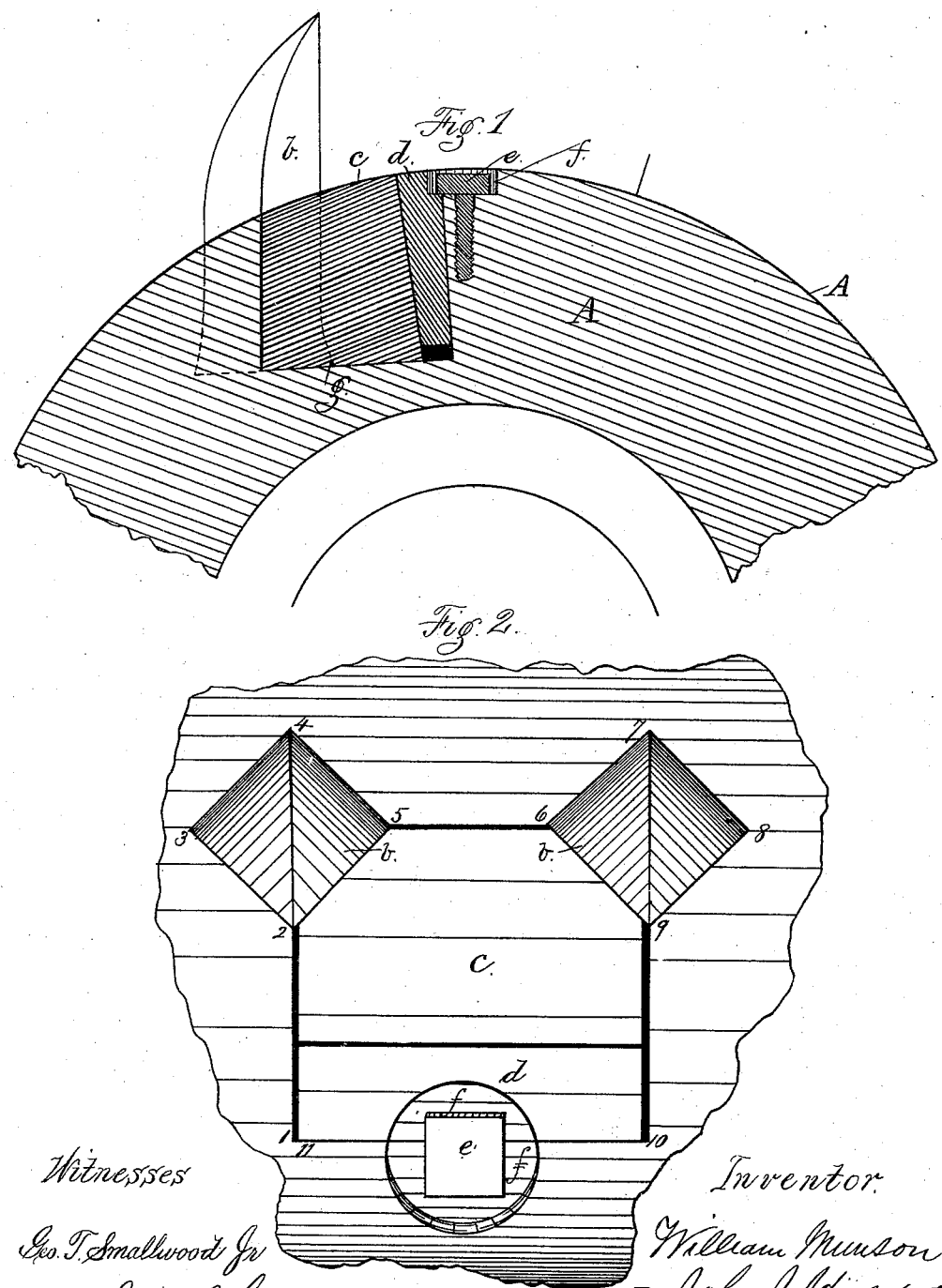

UNITED STATES PATENT OFFICE.

WILLIAM MUNSON, OF SCRANTON, PENNSYLVANIA, ASSIGNOR OF ONE-THIRD HIS RIGHT TO S. D. KINGSLEY, OF SAME PLACE.

IMPROVEMENT IN TOOTHED ROLLERS FOR COAL BREAKERS OR CRACKERS.

Specification forming part of Letters Patent No. 169,654, dated November 9, 1875; application filed September 29, 1875.

*To all whom it may concern:*

Be it known that I, WILLIAM MUNSON, of Scranton, in the county of Luzerne and State of Pennsylvania, have invented certain Improvements in Toothed Rollers for Coal Crackers or Breakers; and I do hereby declare that the following, taken in connection with the drawings which accompany and form part of this specification, is a description of my invention sufficient to enable those skilled in the art to practice it.

My improvements relate to a special construction of the cast-iron rolls, and also to the special devices for securing therein removable teeth.

Figure 1 represents a transverse section of a coal-cracker roller made in accordance with my improvement, and with the removable teeth, and devices for firmly holding the same to place; Fig. 2, a top or plan view of the teeth and fastening devices when in place in the roll or cylinder.

A, Fig. 1, represents a cross-section of one of a pair of rollers adapted for use in coal-breaking at the mines; and $b$, one of my removable teeth, inserted in one portion of a socket or cavity cast in the outer surface or periphery of the iron roller, there being similar cavities for each tooth. This cavity, as shown in Figs. 1 and 2, is bounded on the surface of the roller by the lines 1, 2, 3, 4, 5, 6, 7, 8, 9, 10, and 11, and is adapted to receive two teeth, (see Fig. 2,) a block, $c$, of metal for holding the teeth to place, and a wedge-shaped key, $d$, for fastening the block into the roller, and for forcing it against the sides of the teeth, to hold them also firmly to place. A set-screw or bolt, $e$, adapted to be screwed into a threaded hole in the body of the roller, holds the wedge firmly to its place, and locks all these removable parts firmly together and to the roller. The wedge $d$ and the roller have a sunken recess, $f$, to permit the head of the screw $e$, when screwed down, to be flush with or below the surface of the roller. The teeth $b$ I prefer to make with an enlarging incline, $g$, which precludes its loosening or dropping out under any conditions; and to insert a tooth, it is first placed in the large cavity, which holds the block and key, and is then slid sidewise into that portion of the cavity in which it is afterward locked fast. The block $c$ is broader at its base than at its top, thus facilitating the ready insertion and removal of the wedge when required.

It will now be seen that upon inserting and sliding to place the teeth, and next inserting the block, and forcing home the wedge or key, the angular sides of the block $c$ become forcibly pressed against the adjacent sides of the teeth, holding them rigidly in place, the block being so made as to leave sufficient space between its sides and the cavity of the roller, to allow of all the adjustment needed to tighten up the teeth. The cavity in the roller may be such that the block and key may be located at the front, or at the back, or at the side of the tooth, as preferred.

The bolt or set-screw I prevent from turning and getting loose by inserting a check-piece, $h$, in an appropriate recess, $i$, made either in the key, as shown, or in the roll, the straight face of this check-piece preventing the head of the bolt from allowing it to turn. This check-piece I hold to place by means of a rivet, $k$, passing through it and through the head of the screw, and I rivet down its end.

The teeth may be of oval or other shape in cross-section, if desired, the cavity and the block conforming thereto. The teeth should be steel-pointed.

It will be understood, of course, that the teeth are arranged in rows lengthwise of the roller, and that those of one roller revolve in the space between those of the other roller, the lumps of coal being broken between them. None of the tooth-fastening devices project above the surface of the roller.

Fig. 3 shows a modification in which only one tooth is held by the block and key. Fig. 4 is the same as Fig. 3, except that a single bolt holds two wedges or keys.

Where two teeth are held by a single block and key, as in Figs. 1 and 2, only half as many cavities are needed in the roller, and in consequence they are farther apart from each other, leaving more solid cylindrical surface.

I am aware that rolls have been made in which teeth have been inserted in holes drilled or made entirely through the shell of the roll, such teeth being locked by nuts or other devices on the inner side of such shell; such, therefore, I do not claim; but What I do claim is as follows:

1. The described cast-iron roller for a coal-breaking machine, having in its outer surface the sockets or cavities described, and for the purposes set forth.

2. The combination, with the cavity in the roller, of a tooth or teeth, the block $c$, wedge $d$, and the fastening-screw $e$, substantially as and for the purpose set forth.

3. The combination, with the block $c$, wedge $d$, and set-screw $e$, of the check-piece $h$, as and for the purpose set forth.

WILLIAM MUNSON.

Witnesses:
WILLIAM FITCH,
JOHN ROBEY, Jr.